(12) United States Patent
Lacaze et al.

(10) Patent No.: US 11,884,175 B2
(45) Date of Patent: Jan. 30, 2024

(54) SELF-POWERED DRONE TETHER

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US); William Becker, Monrovia, MD (US); Steven Rotundo, Baltimore, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 883 days.

(21) Appl. No.: 16/452,620

(22) Filed: Jun. 26, 2019

(65) Prior Publication Data

US 2020/0406773 A1 Dec. 31, 2020

(51) Int. Cl.
*B60L 53/36* (2019.01)
*G05D 1/00* (2006.01)
*B64F 1/36* (2017.01)
*B64C 39/02* (2023.01)
*B64U 10/13* (2023.01)
(Continued)

(52) U.S. Cl.
CPC ............ *B60L 53/36* (2019.02); *B64C 39/022* (2013.01); *B64C 39/024* (2013.01); *B64F 1/364* (2013.01); *G05D 1/0094* (2013.01); *B60L 2200/10* (2013.01); *B64U 10/13* (2023.01);
(Continued)

(58) Field of Classification Search
CPC ...... B60L 53/36; B60L 2200/10; B60L 50/53; B60L 53/18; B60L 53/35; B60L 5/08; B64C 39/022; B64C 39/024; B64C 2201/027; B64C 2201/042; B64C 2201/12; B64C 2201/143; B64C 2201/123; B64F 1/364; G05D 1/0094; Y02T 10/70; Y02T 10/7072; Y02T 90/12; Y02T 90/14; B64U 10/13; B64U 50/19; B64U 2101/00; B64U 2201/102; B64U 2101/30
See application file for complete search history.

(56) References Cited

U.S. PATENT DOCUMENTS 4,498,645 A * 2/1985 Hardy ..................... B64C 39/00
244/12.6
5,528,155 A * 6/1996 King .................... G01N 33/442
156/64

(Continued)

*Primary Examiner* — Medhat Badawi
(74) *Attorney, Agent, or Firm* — RowanTree Law Group, PLLC; Joseph W. Schmidt

(57) ABSTRACT

Battery powered quadrotors or drones have a limited operation time. To extend operation time, a powered tether can be used. This tether provides power to the drone allowing it to stay up indefinitely. Most tethered drones are captured to the base station. The tether can reel in and out as the drone moves, but the drone can't go higher or further than the maximum length of the tether. If the tether can be automatically disconnected, the drone could fly off for some remote mission, assuming the drone had an onboard power source such as rechargeable batteries. The present invention relates to a self-powered drone tether that comprises a rechargeable drone in flight which is referred to as the rechargeable drone, a drone that carries a powered tether which is referred to as the tether drone, a coupling mechanism between the rechargeable drone and the tether drone, and a base station with a powered tether and tether deployment system.

15 Claims, 2 Drawing Sheets

(51) Int. Cl.
*B64U 50/19* (2023.01)
*B64U 101/00* (2023.01)

(52) U.S. Cl.
CPC .......... *B64U 50/19* (2023.01); *B64U 2101/00* (2023.01); *B64U 2201/102* (2023.01)

(56) References Cited

U.S. PATENT DOCUMENTS

| | | | | |
|---|---|---|---|---|
| 7,510,142 | B2* | 3/2009 | Johnson | B64C 39/022 244/175 |
| 8,950,698 | B1* | 2/2015 | Rossi | B64C 27/26 244/63 |
| 9,174,732 | B2* | 11/2015 | Jensen | F03D 5/00 |
| 9,457,899 | B2* | 10/2016 | Duffy | G05D 1/104 |
| 9,487,303 | B2* | 11/2016 | Siegel | B60R 16/03 |
| 9,879,655 | B1* | 1/2018 | Vander Lind | B64C 1/26 |
| 9,957,045 | B1* | 5/2018 | Daly | G05D 1/0027 |
| 10,507,914 | B2* | 12/2019 | Walker | H02G 11/02 |
| 10,710,716 | B2* | 7/2020 | Wieczorek | B64C 39/024 |
| 10,723,454 | B1* | 7/2020 | Hovey | A63J 5/02 |
| 10,737,782 | B2* | 8/2020 | Beltman | G05D 1/102 |
| 10,773,799 | B1* | 9/2020 | Thrun | B64D 1/12 |
| 11,148,808 | B2* | 10/2021 | Wiggerich | B64C 39/024 |
| 11,180,249 | B2* | 11/2021 | Walker | B64C 39/022 |
| 11,190,032 | B2* | 11/2021 | Farrahi Moghaddam | B60L 53/12 |
| 11,294,397 | B2* | 4/2022 | Johnson | G05D 1/0016 |
| 2007/0176432 | A1* | 8/2007 | Rolt | H01R 13/639 290/55 |
| 2007/0187547 | A1* | 8/2007 | Kelly | B64B 1/20 244/7 R |
| 2007/0228999 | A1* | 10/2007 | Kit | H05B 45/10 315/291 |
| 2008/0087762 | A1* | 4/2008 | Holloman | B64C 1/0009 244/30 |
| 2009/0152391 | A1* | 6/2009 | McWhirk | B64B 1/70 244/30 |
| 2013/0233964 | A1* | 9/2013 | Woodworth | G05D 1/0866 244/175 |
| 2015/0001338 | A1* | 1/2015 | Siegel | B64D 33/00 244/58 |
| 2015/0120126 | A1* | 4/2015 | So | G01C 23/00 701/26 |
| 2015/0183512 | A1* | 7/2015 | Jensen | G05D 1/0866 244/76 R |
| 2015/0295646 | A1* | 10/2015 | Clemmensen | H04B 10/11 398/125 |
| 2015/0344136 | A1* | 12/2015 | Dahlstrom | B64C 39/024 239/722 |
| 2016/0200437 | A1* | 7/2016 | Ryan | B64C 39/022 244/99.2 |
| 2016/0311526 | A1* | 10/2016 | Geise | B64C 27/52 |
| 2016/0318607 | A1* | 11/2016 | Desai | A01M 7/00 |
| 2016/0340006 | A1* | 11/2016 | Tang | B64C 39/024 |
| 2016/0378108 | A1* | 12/2016 | Paczan | B64D 31/06 705/330 |
| 2017/0008626 | A1* | 1/2017 | Walker | H02G 11/02 |
| 2017/0043872 | A1* | 2/2017 | Whitaker | B64F 3/02 |
| 2017/0121036 | A1* | 5/2017 | Hachtmann | B64C 31/06 |
| 2017/0190418 | A1* | 7/2017 | Patten | H01B 7/0009 |
| 2017/0190444 | A1* | 7/2017 | Hundemer | B64F 1/0297 |
| 2017/0291704 | A1* | 10/2017 | Alegria | G05D 1/0866 |
| 2017/0300051 | A1* | 10/2017 | Zhou | G08G 5/0013 |
| 2018/0107210 | A1* | 4/2018 | Harnett | B64D 1/02 |
| 2018/0149137 | A1* | 5/2018 | Nordstrom | B63B 35/50 |
| 2018/0155152 | A1* | 6/2018 | Belani | B65H 54/28 |
| 2018/0292843 | A1* | 10/2018 | Nordstrom | B63B 1/048 |
| 2019/0100307 | A1* | 4/2019 | Beltman | G05D 1/104 |
| 2019/0217952 | A1* | 7/2019 | Zawadzki | G05D 1/104 |
| 2019/0283871 | A1* | 9/2019 | Wieczorek | B64C 39/024 |
| 2020/0189695 | A1* | 6/2020 | Nordstrom | B63B 22/18 |
| 2020/0189732 | A1* | 6/2020 | Walker | B64F 3/00 |
| 2020/0218288 | A1* | 7/2020 | Johnson | G05D 1/0022 |
| 2020/0307407 | A1* | 10/2020 | Fischer | B64C 39/024 |
| 2020/0307830 | A1* | 10/2020 | Fischer | H02M 3/156 |
| 2020/0314627 | A1* | 10/2020 | Fischer | H04W 64/003 |
| 2020/0369408 | A1* | 11/2020 | Dolata | B64C 39/022 |
| 2020/0385145 | A1* | 12/2020 | Mackin | B64F 1/08 |
| 2020/0406773 | A1* | 12/2020 | Lacaze | G05D 1/0094 |
| 2021/0221476 | A1* | 7/2021 | Szydlowski | B63B 35/285 |
| 2021/0316858 | A1* | 10/2021 | Pargoe | B64C 39/022 |
| 2021/0341128 | A1* | 11/2021 | Abron | G09F 21/14 |
| 2022/0024583 | A1* | 1/2022 | Barawkar | G05D 1/0866 |

* cited by examiner

SELF-POWERED DRONE TETHER

CROSS-REFERENCES TO RELATED APPLICATIONS

Not applicable.

BACKGROUND OF THE INVENTION

1. Field of the Invention

The current invention describes a self-powered drone tether which comprises a rechargeable drone in flight, a drone that carries a powered tether, a coupling mechanism between the rechargeable drone and the tether drone, and a base station with a powered tether and tether deployment system.

2. Description of Related Art

The statements in this section merely provide background information related to the present disclosure and may not constitute prior art.

There have been no reports in the literature of a self-powered drone tether that contains a rechargeable drone in flight, a drone that carries a powered tether, a coupling mechanism between the rechargeable drone and the tether drone, and a base station with a powered tether and tether deployment system.

There has been a solar powered tethered drone that has been developed in which it includes an array of solar panels, a battery bank of at least one battery electrically connected to the array of solar panels, a landing and connection platform electrically connected to the battery bank, a cable electrically connected to the landing and connection platform, a drone electrically and mechanically connected to the cable, the drone having at least one camera, and a transmitter to allow images captured by the camera to be sent to a base station. This invention is described in US Pat. No. 10,613. It is worth noting that in this system, the drone is not rechargeable as required by the present invention.

There has been a tethered charging/recharging assembly system that has been developed in which it suitable for moving vehicles such as a self-propelled conventional type of vehicle The tethered charging/recharging system may quickly couple and deliver energy charges, recharges, or other types of power propellants to vehicles while the vehicles are stationary or in motion. These types of assemblies are especially useful when one needs to provide power to vehicles when only limited downtime of the vehicles is wanted. They are suitable for use in the agricultural, construction, defense, or other industries. This invention is described in US Patent Application No. 20170361721. It is worth noting that there are not two separate drones in this assembly system. In the present invention, there is a tethered drone and a rechargeable drone which then couple together and also there is a base system with a powered tether and a tether deployment system.

There has been a tethered drone assembly that has been developed which is vehicle based or a free-standing tethered drone assembly system. There are several sensors located on the tethered drone which allow it to detect objects and environmental conditions in front of, behind, or in the side of the vehicle. The drones can be controlled remotely by the user or automatically by the sensor that is used. This invention is described in US Patent Application No. 20160318607. It is worth noting that there are no rechargeable drone present in this tethered drone system unlike that of the present invention.

Overall, there have been no reports in the patent literature on drone system that comprises a self-powered drone with a rechargeable drone and a tether drone along with a coupling mechanism as well as a base station with a powered tether and a tether deployment system.

SUMMARY OF THE INVENTION

The present invention describes a self-powered drone that comprises a rechargeable drone in light, which is thereafter referred to as the rechargeable drone, a drone that carries a powered tether, which is thereafter referred to as the tether drone, a coupling mechanism between the rechargeable drone and the tether drone, and a base station with a powered tether and tether deployment system.

In this case, the tether transmits both power and data and carries a down converting voltage system capable of converting voltage from the tether to the voltage needed by the rechargeable drone.

The coupling mechanism between the tether drone and the rechargeable drone is an electromagnet, an electroplate, permanent magnet, or a mechanical binding mechanism.

During the process of recharging, the weight of the tether drone, the rechargeable drone, and the tether is lifted by the tether drone alone or by the rechargeable drone alone, or a combination of the two.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF THE INVENTION

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

Battery powered quadrotors or drones have a limited operation time. To extend operation time, a powered tether can be used. This tether provides power to the drone allowing it to stay up indefinitely. Most tethered drones are captured to the base station. The tether can reel in and out as the drone moves, but the drone can't go higher or further than the maximum length of the tether. If the tether can be automatically disconnected, the drone could fly off for some remote mission, assuming the drone had an onboard power source such as rechargeable batteries. If the tether was disconnected at altitude, the disconnected tether would fall. It could be entangling with itself or brush. It could fall into puddles or mud. It could become broken on impact. One mitigation option would be to reel it in as it falls. However, it would have to be reeled in at 1 g which is impractical at longer lengths.

Figure 1:
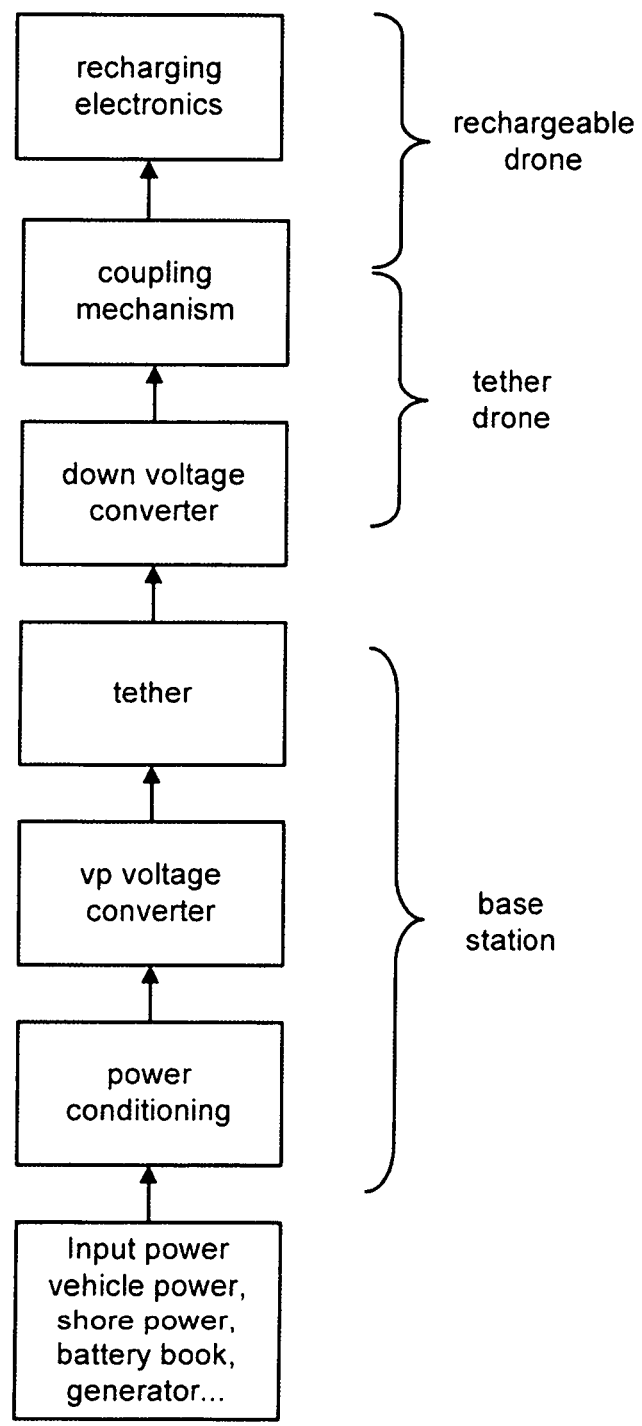
FIG. 1—Figure showing the different parts of the rechargeable drone, tether drone, and base station.

FIG. 1 shows a schematic of the different parts associated with the rechargeable drone, tether drone and base station. There are recharging electronics along with a coupling mechanism leading to the down voltage converter. The tether drone is connected via a tether through a docking mechanism to the base station which has a vp voltage converter, power conditioning, and leads to the input power vehicle power, shore power, battery book, and generator.

Figure 2:
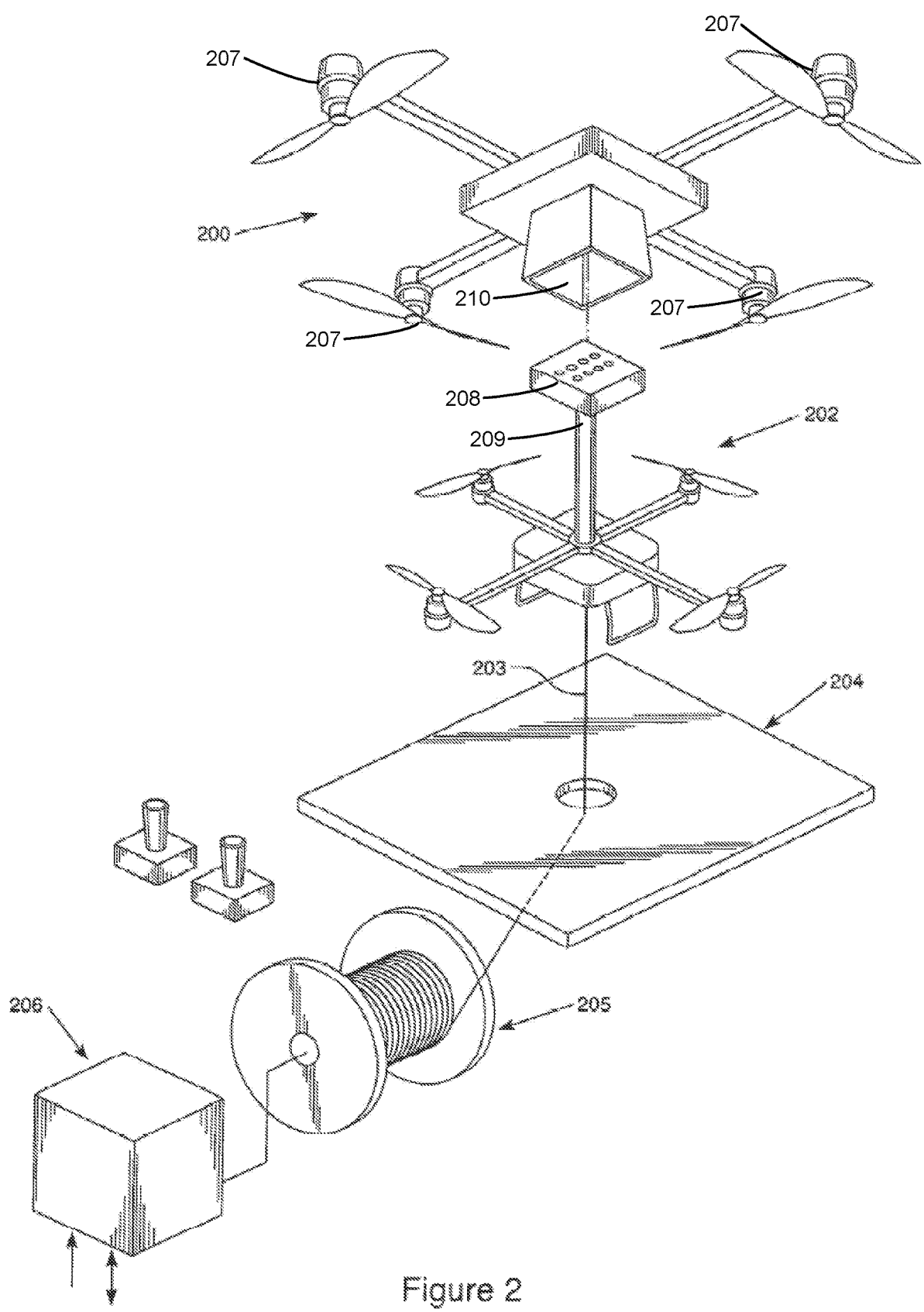
FIG. 2—Figure of the rechargeable drone (200), tether drone (202), the tether (203), the docking mechanism (204), the tether holder (205), and the vehicle power link (206).

This patent is for a powered drone tether as can be seen in FIG. 2. A second drone (the tether drone (202)) is attached to the end of the tether (203). When the main drone (the rechargeable drone (200)) disconnects, the tether drone (200) can hold the disconnected tether (203) either in place or as it is slowly reeled in from the tether holder (205). If sufficient power can be transmitted through the tether (203), the rechargeable drone (200), when connected, can disengage (e.g., stop the motor or otherwise slow) its motor or motors 207 and recharge its batteries.

The rechargeable drone (200) can be reconnected to the tether (203) held aloft by the tether drone (202). This allows the rechargeable drone (200) to reconnect without having to land and pause its surveillance mission.

If you didn't have a tether drone (202) but just tried to automatically reconnect the rechargeable drone (200) to a recharging station at the base station, then the rechargeable drone would have to be agile enough to mate to the recharger. If the base station were on a ground vehicle driving off road or on a ship bouncing through the waves, then the rechargeable drone (200) would have to be more responsive or the docking station would have to be larger and more tolerant of misalignment.

The tether drone could be fast and agile allowing more reliable recoupling than a larger sluggish rechargeable drone trying to recouple to a charging point on the base station. The motion of a base vehicle, on rough roads or waves, would have small impact on the tether drone when deployed. Wind would affect both drones but in a similar fashion.

Using a tether can also have advantages when landing. Landing on small platform or docking station can be difficult especially when the platform is moving or there is significant wind. Given a tether with sufficient strength, the landing is simplified as the tether can wench the drone down to the correct location. This landing strategy can be used even if the tether does not transmit power but is used solely for landing an unwieldy drone on a small docking station.

A self-powered drone tether has been developed that comprises a rechargeable drone (200), which is also referred to as the rechargeable drone, a drone that carries a powered tether, which is also referred to as the tether drone (202), a coupling mechanism between the rechargeable drone (200) and the tether drone (202) and a base station with a powered tether and tether deployment system.

Rechargeable refers to having the ability to have its electrical energy restored by connection to a power supply.

A tethered drone (202) is connected to a mobile ground station by a powered tether (rope) (203) similar to a dog on a leash. The ground station feeds the drone (via the tether (203)) electricity and water while also providing its user with persistent surveillance. This type of drone currently exists and could provide the U.S. military, the U.S. Border Patrol, first responders, and others with significant improvements. A tether deployment system deploys the rope to connect the tethered drone to the mobile ground station.

The tether transmits both power and data from the mobile ground station to the tethered drone. The voltage on the tether is above 500 V.

The tether drone carries a down converting voltage system capable of converting voltage from the tether to the voltage needed by the rechargeable drone. A voltage converter which is also known as a power converter or voltage transformer is an electric power conversion device used to change the electrical output of a power source.

The coupling mechanism 208 between the tether drone 202 and the rechargeable drone 200 is an electromagnet, an electroplate, permanent magnet, or a mechanical binding mechanism held a distance from the tether drone 202 by a standoff 209. An electromagnet is a type of magnet where the magnetic field is produced by an electric current. They usually consist of wire wound into a coil and a current through the wire creates a magnetic field which is concentrated in the hole, denoting the center of the coil. Electroplating involves a process that uses an electric current to reduce dissolved metal cations so that they form a thin coherent metal coating on an electrode. The resulting material is referred to as an electroplate. A permanent magnet is a magnet that retains its magnetic properties in the absence of an inducing field or current.

The tether drone has enough thrust to lift the tether itself and the rechargeable drone. Thrust refers to pushing something suddenly or violently in a specific direction.

During the process of recharging, the weight of the tether drone, the rechargeable drone, and the tether is lifted either by the tether drone alone, by the rechargeable drone alone, or by a combination of both the tether drone and the rechargeable drone. The drone being recharged, once coupled with the tether drone, is reeled in using the tether either to a lower altitude, the ground level, or to a docking mechanism.

The tether drone can take off and pull the tether to the desired coupling altitude and the coupling maneuver can be performed both in the air or when the tether drone has landed. The motions needed to align and connect the coupling mechanism is performed by having the tether drone stationary and the rechargeable drone moving. In addition, the motions needed to align and connect the coupling mechanism is also performed by having the rechargeable drone stationary and the tethered drone moving. In another scenario, the motions needed to align and connect the coupling mechanism is performed by having both the rechargeable drone and the tether drone moving.

The coupling mechanism 208 carried out by a standoff 209 on the tether drone is a landing pad that mates with a second portion 210 on the rechargeable drone 200. Also, the tether drone 202 and/or the rechargeable drone 200 have fiducials or other markings that can help the coupling maneuver. Fiducials are objects placed in the field of view of an imaging system which appears in the image produced, for use as a point of reference or a measure. It may be either something placed into or on the imaging subject, or a mark or set of marks in the reticle of an optical instrument.

The tether drone, the rechargeable drone, and/or the base station carry sensors such as RADAR, LADAR, stereo, ranging radios and other types of sensors to aid the coupling maneuver. RADAR, also known as Radio Detection and Ranging, refers to a detection system that uses radio waves to determine the range, angle, or velocity of objects and can be used to detect aircraft, ships, spacecraft, guided missiles, motor vehicles, weather formations, and terrain. Ladar refers to Laser Detecting and Ranging Systems and uses light to determine the distance to an object. Since the speed of light is well known, LADAR uses a short-pulsed laser to illuminate a target and then time how long it takes the light to return. The advantage of LADAR over RADAR is that LADAR can also image the target at the same time as determine the distance which allows a 3D view of the object in question. This provides long range reconnaissance with greater fidelity and thus greater recognition range than other technologies. Stereo cameras are a type of camera with two or more lenses with a separate image sensor or film frame for each lens which allows the camera to simulate human binocular vision, and gives it the ability to capture three-dimensional images, a process known as stereo photography.

Ranging radios are a system of radio transmitting stations, each of which transmits a signal that not only carries identification but also is of intrinsic value to a navigator in fixing his position. Modern very-high-frequency omnidirectional range (VOR) has been developed in several different forms since 1930 that transmits two signals simultaneously in all directions. Operating in the very high frequency (VHF) range, it is less subject than the lower-frequency radio range to disturbances by day-night alternation, weather, and other causes. The two simultaneously emitted signals have a difference in electrical phase that varies precisely with the direction from the station. Special receiving equipment in the aircraft detects the difference and displays it to the pilot in the form of a bearing. Used with distance-measuring equipment (DME), VOR provides a basic point-to-point guidance system for airliners.

The system is capable of sensing obstructions such as buildings and power lines and can automatically move and or retract the tether to avoid collision.

The base station is mounted to a stationary platform such as a building or the ground. The base station can also be mounted to a moving platform such as a ground vehicle or a ship.

The power is transmitted over a fiberoptic cable and the tether is used as an aid to recover (land) the rechargeable drone, This could be used if the rechargeable drone is not very agile and needs to land on a small landing pad that might be moving and pitching, say at sea or driving down a rough road. Agile refers to the ability to move quickly and easily. The tether does not carry power.

The present invention also describes the deployment of multiple systems on a ground, air, or sea vehicle. Ground vehicles include cars, buses, SUVs, sedans, and trucks. Air vehicles include airplanes and blimps. Sea vehicles include ships, boats, and submarines. The multiple systems keep track of the location of the tethers and tether drones either by modeling their location or by sensing their location and automatically avoiding entanglements. The entanglement prevention mechanism can be as simple as predetermining the workspace for each tether drone and tether or by dynamically assigning workspaces to the tether drones depending on the model of the tether and weather conditions.

Fiducials are mounted on the base station or near the base station to aid with the positioning and coupling maneuvers. The tether drone is automatically reeled in and out with the tether while not in use or recharging another drone. The down converting circuitry in the drone automatically adjusts to the power needs of the drone being recharged.

The input power can come from many sources such as the vehicle being used such as the truck or ship that may carry the base station, the shore power which could be a building, a battery bank, or a generator. A battery bank is a result of joining two or more batteries together for a single application. By connecting batteries, you can increase the voltage, amperage, or both and when you need more power, instead of getting yourself a massive super tanker of an RV battery for example, you can construct a battery bank. A generator is a device that converts motive power into electrical power for use in an external circuit. Some sources of mechanical energy include steam turbines, gas turbines, water turbines, internal combustion engines and even hand cranks.

The base station may condition the input power and it might convert the voltage to a higher voltage to reduce transmission losses in the tether. The tether drone may need to convert the tether power to a lower voltage and other conditioning. The power is transmitted through the coupling mechanism to the rechargeable drone's recharging electronics.

The embodiments of the invention in which an exclusive property or privilege is claimed are defined as follows:

1. A system for an airborne self-powered drone tether docking station, comprising:
   a. a rechargeable drone comprising at least one lifting motor, rechargeable batteries coupled to selectively provide power to the at least one lifting motor, recharging electronics coupled to the rechargeable batteries and operable to direct power to the rechargeable batteries, and having a first portion of a docking mechanism;
   b. a powered tether that transmits power and data along a length of the tether from a proximal end coupled to a powered base station and to a distal end; and
   c. a single tether drone comprising a plurality of motors and having a second portion of the docking mechanism, the single tether drone coupled to the powered tether at the distal end and having electronics to convert the power transmitted through the powered tether for use in charging the rechargeable batteries of the rechargeable drone;
   wherein the rechargeable drone (i) selectively couples, by engaging the first portion of the docking mechanism with the second portion of the docking mechanism, to the single tether drone, (ii) disengages the at least one lifting motor, (iii) receives power from the powered tether via the docking mechanism and by the recharging electronics, (iv) charges, by the recharging electronics, the rechargeable batteries, and (v) selectively decouples, by disconnecting the first portion of the docking mechanism with the second portion of the docking mechanism and thereby freeing the rechargeable drone from any connection to the tether;
   wherein the single tether drone activates the plurality of motors, thereby maintaining the distal end of the powered tether aloft while the rechargeable drone recharges; and
   wherein the rechargeable drone transitions the at least one lifting motor from an active state to a disengaged state when coupled to the single tether drone.

2. THE SYSTEM OF claim 1, FURTHER COMPRISING:
   A BASE STATION, WHEREIN THE BASE STATION COMPRISES A TETHER DEPLOYMENT SYSTEM

THAT IS COUPLED TO SELECTIVELY DEPLOY OR RETRIEVE THE SINGLE TETHER DRONE.

3. The system of claim 1, wherein the powered tether comprises a fiberoptic cable.

4. The system of claim 1, wherein the single tether drone further comprises a down converting voltage system that converts a first voltage of the powered tether to a second voltage of the recharging electronics of the rechargeable drone.

5. The system of claim 1, wherein at least one of the first portion and the second portion of the docking mechanism comprises one or more of an electromagnet and a permanent magnet.

6. The system of claim 1, wherein the second portion of the docking mechanism is coupled to the single tether drone via a standoff.

7. The system of claim 1, wherein the plurality of motors of the single tether drone, when activated, provide thrust sufficient to support the rechargeable drone in an airborne condition in association with a recharging mode of the rechargeable batteries.

8. The system of claim 1, wherein the first portion of the rechargeable drone selectively automatically couples and decouples with the second portion of the single tether drone in association with respective relative movement of the rechargeable drone and the single tether drone between approximated and displaced positions, and when in an airborne condition of the rechargeable drone.

9. The system of claim 1, wherein the single tether drone is a sole tether drone coupled to the tether.

10. A system, comprising:
a tether for transmitting power from a base station;
a single tether drone mounted to the tether, the single tether drone including a first motor, and
a rechargeable drone selectively couplable to the single tether drone, the rechargeable drone including a second motor and a rechargeable battery to provide power to the second motor;
wherein the single tether drone and the rechargeable drone transition between a coupled relation and a released relation;
wherein, in the coupled relation, the single tether drone transmits power from the tether to the rechargeable battery of the rechargeable drone;
wherein, in the coupled relation, the single tether drone supports the rechargeable drone in an airborne condition; and
wherein, in the coupled relation, the rechargeable drone transitions the second motor from an active state to a disengaged state.

11. The system of claim 10, wherein the single tether drone and the rechargeable drone selectively transition between the coupled relation and the released relation in association with relative movement of the single tether drone and the rechargeable drone between an approximated position and a displaced position, and when in the airborne condition of the rechargeable drone.

12. The system of claim 11, wherein the single tether drone includes a first docking segment and the rechargeable drone includes a second docking segment, the first and second docking segments engaged when in the coupled relation of the single tether drone and the rechargeable drone, and disengaged when in the released relation of the single tether drone and the rechargeable drone.

13. The system of claim 12, wherein at least one of the first docking segment and the second docking segment comprises one or more of an electromagnet and a permanent magnet.

14. The system of claim 10, wherein the single tether drone includes a down voltage converter, the down voltage configured to reduce voltage associated with power transmitted through the powered tether for use by the rechargeable battery of the rechargeable drone.

15. The system of claim 10, wherein the single tether drone is a sole tether drone coupled to the tether.

* * * * *